US012577085B2

(12) United States Patent (10) Patent No.: US 12,577,085 B2
Puszkiewicz et al. (45) Date of Patent: Mar. 17, 2026

(54) SYSTEMS AND METHODS FOR LEVELING AND OSCILLATION CONTROL OF A LIFT DEVICE

(71) Applicant: Oshkosh Corporation, Oshkosh, WI (US)

(72) Inventors: Ignacy Puszkiewicz, Hagerstown, MD (US); Gregory S. Brulo, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/780,807

(22) Filed: Jul. 23, 2024

(65) Prior Publication Data

US 2024/0375924 A1 Nov. 14, 2024

Related U.S. Application Data

(63) Continuation of application No. 18/127,921, filed on Mar. 29, 2023, now Pat. No. 12,071,332.

(Continued)

(51) Int. Cl.
 *B66F 9/075* (2006.01)
 *B60G 9/02* (2006.01)
 (Continued)

(52) U.S. Cl.
 CPC ........... *B66F 9/07513* (2013.01); *B60G 9/02* (2013.01); *B66F 9/0755* (2013.01);
 (Continued)

(58) Field of Classification Search
 CPC ................ B66F 9/07513; B66F 9/0755; B66F 9/07559; B66F 11/046; B66F 13/00;
 (Continued)

(56) References Cited

U.S. PATENT DOCUMENTS 5,746,441 A * 5/1998 VanDenberg .......... B60G 9/003
                                                   280/124.116
6,126,178 A 10/2000 Chino
             (Continued)

FOREIGN PATENT DOCUMENTS

CA        3091594 A1    3/2021
DE        829556 C      1/1952
             (Continued)

OTHER PUBLICATIONS

Hanke et al. DE 10 2008 060711 Machine English Translation, ip.com (Year: 2008).*
             (Continued)

*Primary Examiner* — Karen Beck
(74) *Attorney, Agent, or Firm* — FOLEY & LARDNER LLP

(57) ABSTRACT

A leveling system for a lift device includes an axle, a pin, a cradle, and a chassis. The axle is configured to rotatably couple with one or more tractive elements. The pin extends through a bore of the axle. The cradle is pivotally coupled with the pin. The chassis is pivotally coupled with the pin and includes a first actuator and a second actuator. The first actuator and the second actuator each include a body and a rod configured to extend relative to the body. The rods of the first actuator and the second actuator are configured to be extended to engage corresponding surfaces on opposite sides of the cradle. The cradle and the chassis are configured to rock in unison a limited angular amount relative to the axle.

12 Claims, 10 Drawing Sheets

Related U.S. Application Data

(60) Provisional application No. 63/329,549, filed on Apr. 11, 2022.

(51) Int. Cl.
  B66F 11/04      (2006.01)
  B66F 13/00      (2006.01)

(52) U.S. Cl.
  CPC ........ B66F 9/07559 (2013.01); B66F 11/046 (2013.01); B66F 13/00 (2013.01)

(58) Field of Classification Search
  CPC .... B60G 9/02; B60G 9/704; B60G 2200/322; B60G 17/005; B60G 2204/45; B60G 2300/022; B60G 2300/06; B60G 2400/0511; B60G 2400/252; B60G 2400/60; B60G 2401/12
  See application file for complete search history.

(56)         References Cited

U.S. PATENT DOCUMENTS

| | | | | |
|---|---|---|---|---|
| 10,532,620 | B1 * | 1/2020 | Klein | B60G 5/065 |
| 2008/0231011 | A1 * | 9/2008 | Bordini | B60G 17/0152 |
| | | | | 280/124.112 |
| 2011/0288726 | A1 | 11/2011 | Mackin et al. | |
| 2017/0291802 | A1 | 10/2017 | Hao et al. | |
| 2017/0291805 | A1 | 10/2017 | Hao et al. | |
| 2018/0162704 | A1 | 6/2018 | Hao et al. | |
| 2019/0071291 | A1 | 3/2019 | Puszkiewicz et al. | |
| 2019/0119088 | A1 | 4/2019 | Puszkiewicz et al. | |
| 2019/0185301 | A1 | 6/2019 | Hao et al. | |
| 2019/0322512 | A1 | 10/2019 | Puszkiewicz et al. | |
| 2019/0352157 | A1 | 11/2019 | Hao et al. | |
| 2020/0031641 | A1 | 1/2020 | Puszkiewicz et al. | |
| 2020/0317480 | A1 * | 10/2020 | Shankar | B66F 11/044 |
| 2020/0317486 | A1 | 10/2020 | Puszkiewicz et al. | |
| 2021/0002112 | A1 | 1/2021 | Puszkiewicz et al. | |
| 2021/0155463 | A1 | 5/2021 | Hao et al. | |
| 2021/0276841 | A1 | 9/2021 | Borofka et al. | |
| 2021/0276848 | A1 | 9/2021 | Miller et al. | |
| 2021/0395058 | A1 | 12/2021 | Hao et al. | |
| 2022/0134946 | A1 | 5/2022 | Brulo | |
| 2022/0194769 | A1 | 6/2022 | Kobel et al. | |
| 2022/0198905 | A1 | 6/2022 | Brulo et al. | |
| 2022/0234873 | A1 | 7/2022 | Miller et al. | |
| 2023/0183050 | A1 | 6/2023 | Puszkiewicz et al. | |
| 2023/0322537 | A1 * | 10/2023 | Puszkiewicz | B60G 7/04 |
| | | | | 280/781 |

FOREIGN PATENT DOCUMENTS

| | | | | |
|---|---|---|---|---|
| DE | 10107644 | B4 | 2/2001 | |
| DE | 102008060711 | A1 * | 7/2009 | ......... B66F 9/07586 |
| DE | 10 2013 222 254 | A1 | 4/2015 | |
| EP | 2 389 798 | A1 | 11/2011 | |
| WO | WO-91/15376 | A1 | 10/1991 | |
| WO | WO 1991/015376 | | * 10/1991 | |
| WO | WO-2020/205153 | A1 | 10/2020 | |

OTHER PUBLICATIONS

Office Action issued in EP Appl. No. 23718504.6 dated Sep. 1, 2025.

* cited by examiner

SYSTEMS AND METHODS FOR LEVELING AND OSCILLATION CONTROL OF A LIFT DEVICE

CROSS-REFERENCE TO RELATED PATENT APPLICATION

This application is a continuation of U.S. application Ser. No. 18/127,921, filed Mar. 29, 2023, which claims the benefit of and priority to U.S. Provisional Application No. 63/329,549, filed Apr. 11, 2022, the entire disclosure of which is incorporated by reference herein.

BACKGROUND

The present disclosure relates to lift devices. More particularly, the present disclosure relates to leveling systems for lift devices.

SUMMARY

At least one embodiment relates to a leveling system for a lift device. The leveling system includes an axle, a pin, a cradle, and a chassis. The axle is configured to rotatably couple with one or more tractive elements. The pin extends through a bore of the axle. The cradle is pivotally coupled with the pin. The chassis is pivotally coupled with the pin. The chassis includes a first actuator and a second actuator. The first actuator and the second actuator each include a body and a rod configured to extend relative to the body. The rods of the first actuator and the second actuator are configured to be extended to engage corresponding surfaces on opposite sides of the cradle. The cradle and the chassis are configured to rock in unison a limited angular amount relative to the axle.

In some embodiments, the first actuator and the second actuator are configured to extend or retract the rod relative to the body to adjust a relative angular orientation between the chassis and the cradle. The cradle and the chassis may be configured to rotate in unison the limited angular amount relative to the axle independently of a current relative angular orientation between the cradle and the chassis.

The first actuator and the second actuator are configured to operate to extend or retract to level the chassis relative to the cradle without adjusting a relative angular orientation between the cradle and the axle, according to some embodiments. Opposite ends of the cradle may be configured to directly contact corresponding surfaces of the axle when rocking between a first angular orientation and a second angular orientation relative to the axle.

In some embodiments, a first end of the cradle directly contacts a first corresponding surface of the axle when the cradle rocks to the first angular orientation relative to the axle, and a second end of the cradle directly contacts a second corresponding surface of the axle when the cradle rocks to the second angular orientation relative to the axle. The cradle may be fixedly coupled with the pin.

In some embodiments, the axle includes a protrusion. The protrusion may include a bore that extends through the protrusion in a longitudinal direction and the pin extends through the bore.

In some embodiments, the pin defines an axis and the cradle and the chassis are configured to rotate or pivot in unison about the axis relative to the axle the limited angular amount. The chassis may be pivotally coupled with the pin through a trunnion mount.

In some embodiments, the leveling system further includes a pair of strain gauges or position sensors. The pair of strain gauges or position sensors may be positioned on opposite lateral sides of the pin and are configured to measure a strain or a force applied by the cradle as the cradle rocks relative to the axle.

Another embodiment of the present disclosure is a leveling system for a lift device. The leveling system includes an axle, a pin, and a chassis. The axle is configured to rotatably couple with one or more tractive elements. The pin extends through a bore of the axle. The chassis pivotally couples with the pin. The chassis includes a first actuator and a second actuator. The first actuator and the second actuator each include a body and a rod configured to extend relative to the body. Ends of the rods of the first actuator and the second actuator may be a predetermined distance from an exterior surface of the axle when the axle and the chassis are parallel. The axle is configured to rock relative to the chassis a limited angular amount between a first angular position and a second angular position.

In some embodiments, the end of the rod of the first actuator is configured to directly contact a first corresponding portion of the exterior surface of the axle when the axle is in the first angular position and the end of the rod of the second actuator is configured to directly contact a second corresponding portion of the exterior surface of the axle when the axle is in the second angular position.

In some embodiments, the rods of the first actuator and the second actuator each include a distance sensor configured to measure a current distance between the end of the rod and the exterior surface of the axle. The first actuator and the second actuator may be operated to extend until the current distance between the ends of the rods of the first actuator and the second actuator and the exterior surface of the axle is substantially equal to the predetermined distance to achieve the predetermined distance between the ends of the rods and the exterior surface of the axle when the axle and the chassis are parallel.

Another embodiment of the present disclosure is a lift device. The lift device includes a lift base, a front axle, a rear axle, a front leveling system, and a controller. The front leveling system is configured to couple the front axle with the lift base and a rear leveling system is configured to couple the rear axle with the lift base. The rear axle includes a sensor configured to measure a relative orientation between the lift base and the rear axle. The controller is configured to obtain the relative orientation between the lift base and the rear axle and operate the front leveling system based on the relative orientation between the lift base and the rear axle.

In some embodiments, the front leveling system is configured to adjust a relative orientation between the front axle and the lift base to achieve a desired relative orientation at the front axle and the rear leveling system is configured to adjust the relative orientation between the rear axle and the lift base to achieve a desired orientation at the rear axle. At least one of the front leveling system and the rear leveling system is configured to allow an additional amount of limited relative rotation when the corresponding one of the front axle or the rear axle is at the desired orientation.

In some embodiments, at least one of the rear leveling system and the front leveling system include a pair of sensors configured to measure an indication of a relative orientation between the corresponding one of the front axle or the rear axle and the lift base. At least one of the rear leveling system or the front leveling system includes an actuator. The actuator includes a body, and a rod. The body is rotatably coupled with the lift base at a first end of the actuator. The rod is configured to translate relative to the body and slidably and pivotally coupled with a slot of a corresponding one of the front axle or the rear axle. Operation of the actuator adjusts a relative orientation between the lift base and the corresponding one of the front axle or the rear axle to achieve a desired relative orientation between the lift base and the corresponding one of the front axle or the rear axle.

In some embodiments, at least one of the rear leveling system or the front leveling system includes a pin, a cradle, and a first and second actuator. The pin extends through a bore of a corresponding one of the front axle or the rear axle. The pin pivotally couples the corresponding one of the front axle or the rear axle with the lift base. The cradle is pivotally coupled with the pin. The first and the second actuator are coupled with the lift base. The first actuator and the second actuator each include a body and a rod configured to extend relative to the body. The rods of the first actuator and the second actuator are configured to be extended to engage corresponding surfaces on opposite sides of the cradle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a lift apparatus includes a chassis or a lift base, a lift apparatus, and front and rear axles. The front and rear axles can support the chassis or the lift base, which supports the lift apparatus. Each of the front and rear axles are coupled with the chassis or the lift base through a corresponding leveling system. The leveling systems may be configured to adjust a relative orientation between the chassis and the front or rear axles. The leveling systems can be operated by a controller independently of each other, or in conjunction with each other. For example, the front leveling system or the rear leveling system may include sensors configured to measure relative orientation between the axle and the chassis. The measured relative orientation can be obtained from one of the front leveling system or the rear leveling system and used by the controller to operate the other of the front leveling system or the rear leveling system. At least of the front leveling system or the rear leveling system may be configured to allow limited oscillation, rocking, or relative rotation between the chassis and the axle, regardless of a current relative orientation between the chassis and the axle that is achieved through operation of the leveling systems.

The terms "front," "rear," "left," and "right" as used herein are relative terms to provide reference and not necessarily intended to be limiting. "Active control" refers to engaging valves, pumps, motors, etc. with a processing circuit or controller to selectively vary the extension, retraction, etc. of an actuator (e.g., a hydraulic cylinder, etc.).

Lift Device

Figure 1:
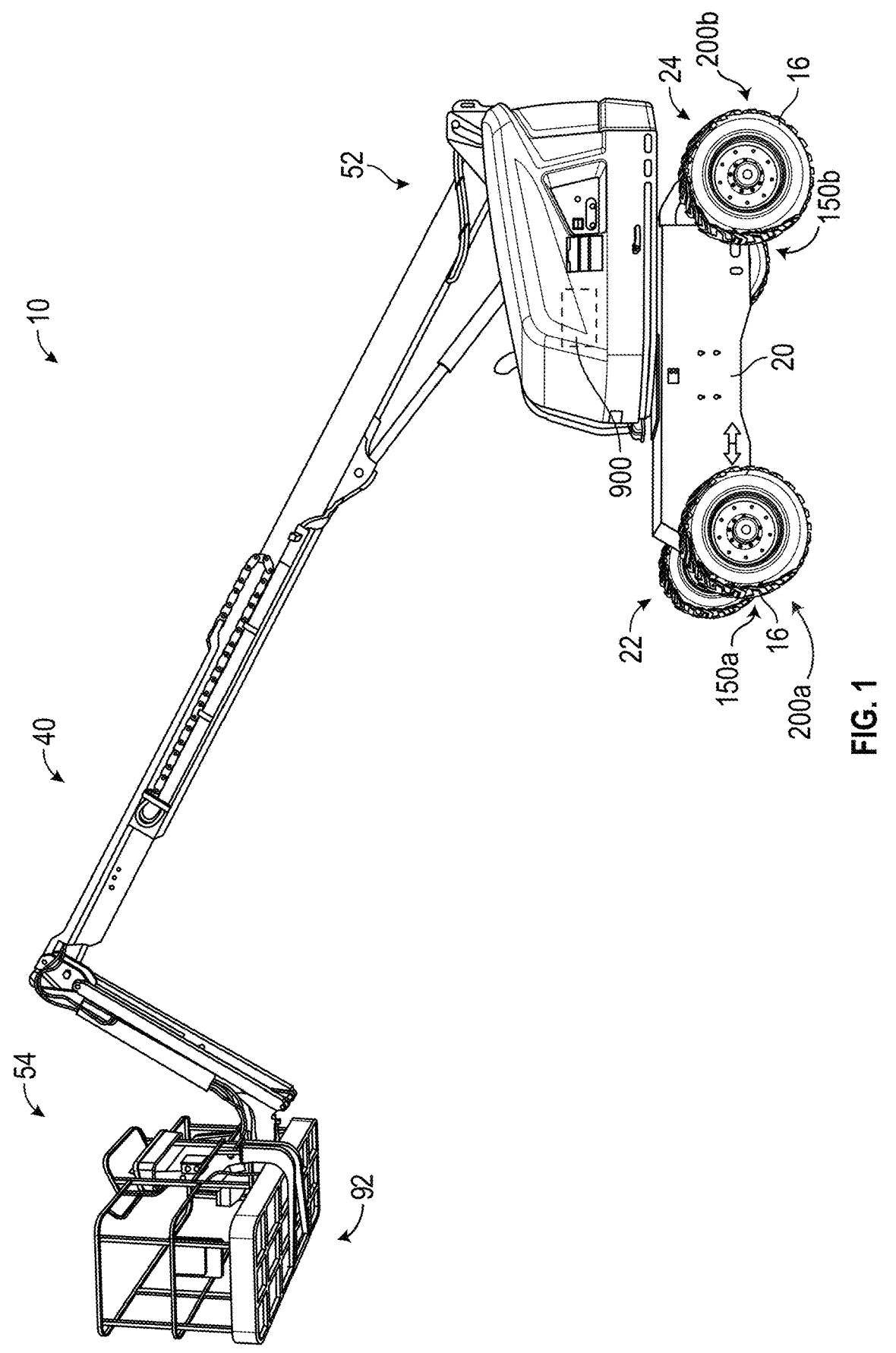
FIG. 1 is a perspective view of a lift device, according to an exemplary embodiment.

As shown in FIG. 1, a machine, shown as lift device 10, includes a chassis, shown as lift base 20. In some embodiments, the lift device 10 is an aerial work platform, a telehandler, a boom lift, a scissor lift, and/or still another type of lift device. As shown in FIG. 1, the lift base 20 supports a lift apparatus 40 (e.g., a boom assembly, an articulated boom, a scissors lift apparatus, a telescoping boom, etc.). In some embodiments, the lift apparatus 40 is coupled with the lift base 20 through a turntable that is rotatable relative to the lift base 20.

As shown in FIG. 1, a first end, shown as front end 22, and an opposing second end, shown as rear end 24, of the lift base 20 is supported by a plurality of tractive elements, shown as tractive elements 16. According to the exemplary embodiment shown in FIG. 1, the tractive elements 16 include wheels. In other embodiments, the tractive elements 16 include a track element, support members, articulated arms, etc., According to an exemplary embodiment, the lift device 10 includes a plurality of driver actuators (e.g., electric wheel motors, etc.). Each of the drive actuators may be positioned to facilitate independently and selectively driving one of the tractive elements 16 to move the lift device 10. In some embodiments, the lift device 10 only includes front drive actuators positioned to drive the front tractive elements 16. In some embodiments, the lift device 10 only includes rear drive actuators positioned to drive the rear tractive elements 16. In some embodiments, the lift device 10 includes drive actuators positioned to drive the front tractive elements 16 and the rear tractive elements 16. In some embodiments, the lift device 10 includes a plurality of brakes (e.g., one for each tractive element 16, etc.) positioned to independently and selectively restrict rotation of each of the tractive elements 16.

The lift apparatus 40 can include various boom sections (e.g., in the case where the lift apparatus 40 is a boom). In other embodiments, the lift apparatus 40 includes a different number and/or arrangement of boom sections (e.g., one, three, etc.). According to an exemplary embodiment, the lift apparatus 40 is an articulating boom assembly. According to another exemplary embodiment, the lift apparatus 40 is a telescopic, articulating boom assembly. By way of example, the lift apparatus 40 may include multiple telescoping boom sections that are configured to extend and retract along a longitudinal centerline thereof to selectively increase and decrease a length of the lift apparatus 40.

As shown in FIG. 1, the lift apparatus 40 has a first end (e.g., a lower end, etc.), shown as base end 52, and an opposing second end, shown as outer end 54. The base end 52 of the lift apparatus 40 is coupled (e.g., pivotally, pinned, fixedly, etc.) with the lift base 20. As shown in FIG. 1, the lift apparatus 40 includes an implement, shown as platform assembly 92, coupled to the outer end 54 of the lift apparatus 40.

According to an exemplary embodiment, the platform assembly 92 is a structure that is particularly configured to support one or more workers. In some embodiments, the platform assembly 92 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 92 includes a control panel to control operation of the lift device 10 from the platform assembly 92. In other embodiments, the platform assembly 92 includes or is replaced with an accessory and/or tool (e.g., forklift forks, etc.). The lift apparatus 40 is configured to operate (e.g., through operation of one or more actuators, electric motors, pneumatic actuators, hydraulic cylinders, engines, pumps, hydraulic systems, etc.) to raise or lower the platform assembly 92.

Figure 2:
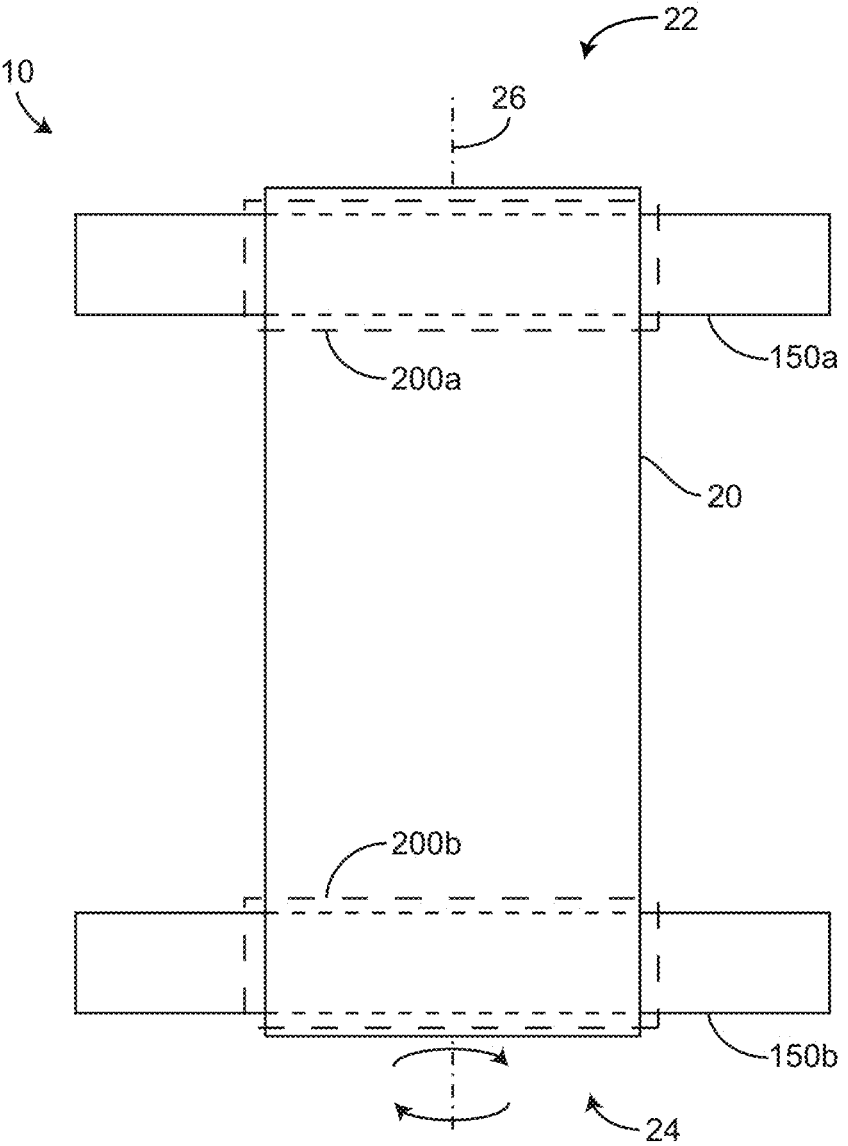
FIG. 2 is a diagram of a portion of the lift device including a front leveling system and a rear leveling system, according to an exemplary embodiment.

Referring to FIGS. 1-2, the lift device 10 includes a front leveling system 200a and a rear leveling system 200b. The front leveling system 200a is configured to facilitate leveling or achieving a desired relative orientation between the lift base 20 and the axles 150, or to facilitate relative rotation in limited amounts between the lift base 20 and the axles 150. The front leveling system 200a can facilitate rotatable coupling and support between the lift base 20 and the front axle 150a. Similarly, the rear leveling system 200b can facilitate rotatable coupling and support between the lift base 20 and the rear axle 150b. The front leveling system 200a and the rear leveling system 200b can be the same leveling systems, or may differ. The front leveling system 200a and the rear leveling system 200b can be operated in conjunction with each other to achieve a desired overall leveling of the lift device 10. For example, if both the front leveling system 200a and the rear leveling system 200b include actuators or hydraulic pistons, an operation of the actuators or hydraulic pistons of the front leveling system 200a and the rear leveling system 200b may be linked to achieve an overall leveling result. In some embodiments, the front leveling system 200a and the rear leveling system 200b include actuators configured to facilitate desired relative rotation or limit relative rotation between the lift base 20 and the axles 150. The lift base 20 may define a central axis 26 (e.g., a longitudinal axis).

It should be understood that in other embodiments, the lift device 10 is any of an articulating boom lift, a telescoping boom lift, a compact crawler boom lift, a telehandler, a scissors lift, a toucan mast boom lift, or any other lift device. Any of the articulating boom lift, the telescoping boom lift, the compact crawler boom lift, the scissors lift, the toucan mast boom lift, etc., may include one or more axles 150, tractive elements coupled with the axles 150, the lift base 20 pivotally coupled with the one or more axles 150, and a leveling system as described according to the various embodiments hereinbelow.

Leveling Systems

Figures 3A, 3B, 3C:
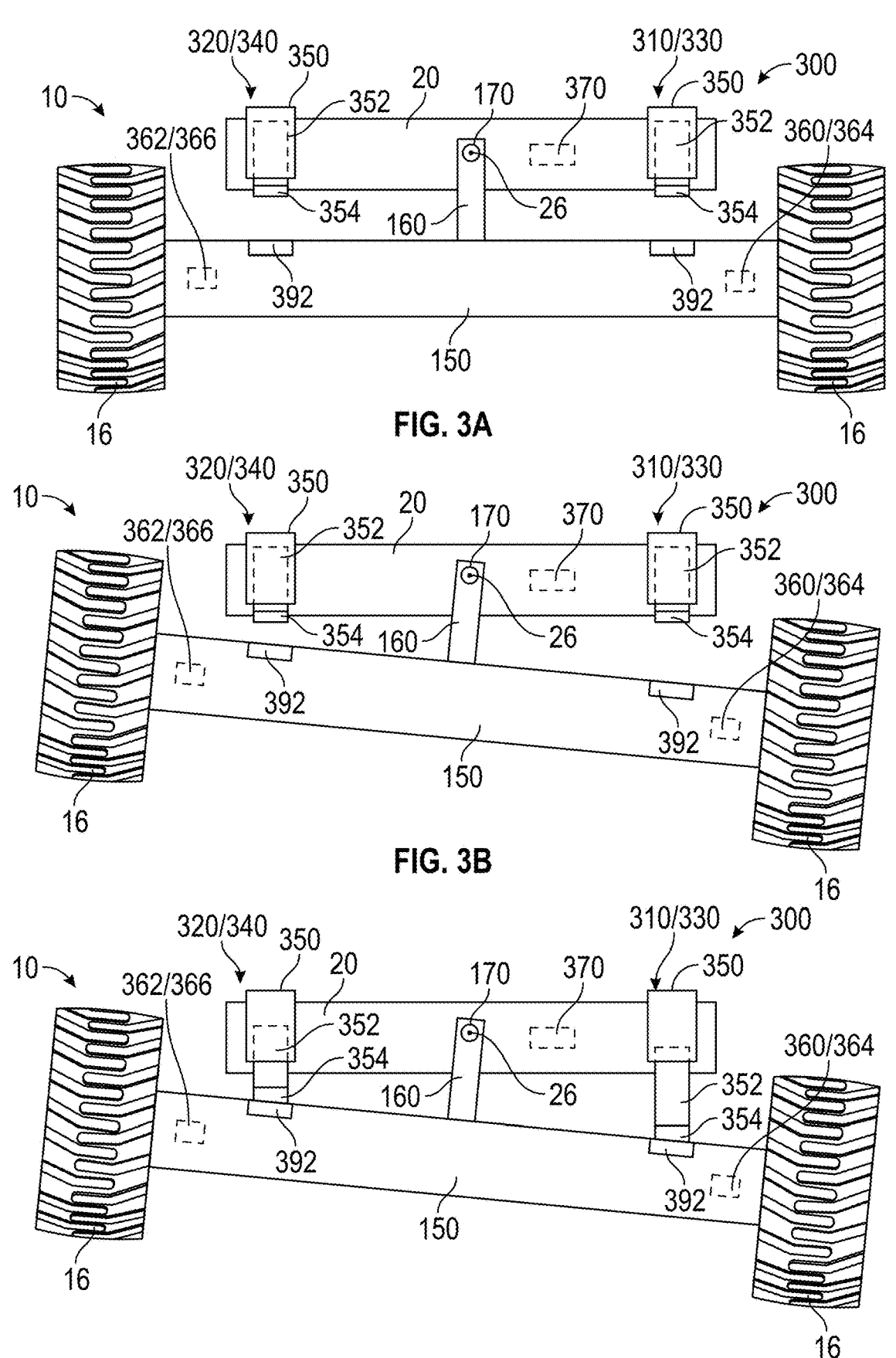
FIG. 3A-3C are diagrams of a first leveling system that may be implemented as one of the front leveling system or the rear leveling system of the lift device of FIGS. 1-2, according to an exemplary embodiment.

As shown in FIGS. 3A-3B, a leveling assembly, shown as leveling system 300 may be implemented in the lift device 10 as the front leveling system 200a or the rear leveling system 200b, or both the front leveling system 200a and the rear leveling system 200b. The leveling system 300 as described herein may be implemented in the lift device 10 or any of the other embodiments of the lift device 10 as described in greater detail above (e.g., an articulating boom lift, a telescoping boom lift, a compact crawler boom lift, a telehandler, a scissors lift, a toucan mast boom lift, or any other lift device, etc.). The lift base 20 can be rotatably or pivotally coupled with a corresponding one of the axles (e.g., the front axle 150a or the rear axle 150b) through a pivot 160 that rotatably or pivotally couples with the lift base 20 at a first end through a pivot pin 170 and fixedly couples, at an opposite end, with the corresponding one of the axles 150.

According to an exemplary embodiment, the leveling system 300 is configured to facilitate maintaining the lift base 20, and/or the platform assembly 92 of the lift device 10 level relative to gravity (e.g., while stationary, while being driven on uneven and/or sloped ground, while operating the lift apparatus 40, etc.). If the leveling system 300 is implemented as the front leveling system 200a, the leveling system 300 can include a first leveling actuator, shown as front left actuator 310, and a second leveling actuator, shown as front right actuator 320. If the leveling system 300 is implemented as the rear leveling system 200b, the leveling system 300 includes a third leveling actuator, shown as rear left actuator 330, and a fourth leveling actuator, shown as rear right actuator 340. In some embodiments (e.g., embodiments where one of the axles 150 is fixed, etc.), the leveling system 300 does not include the rear left actuator 330 and the rear right actuator 340 (e.g., a fixed rear axle and a pivoting front axle). In other embodiments, the leveling system 300 includes the rear left actuator 330 and the rear right actuator 340, but does not include the front left actuator 310 and the front right actuator 320 (e.g., a fixed front axle and a pivoting rear axle). According to an exemplary embodiment, the front left actuator 310, the front right actuator 320, the rear left actuator 330, and the rear right actuator 340 are hydraulic actuators driven by a hydraulic pump and controlled via various valves. In other embodiments, the front left actuator 310, the front right actuator 320, the rear left actuator 330, and the rear right actuator 340 are pneumatic actuators and/or electric actuators.

FIGS. 3A-3C show the leveling system 300 implemented in the lift device 10. Each of the front left actuator 310, the front right actuator 320, the rear left actuator 330, and the rear right actuator 340 includes a main body, shown as cylinder 350, and a rod, shown as rod 352, slidably received within the cylinder 350 and terminating with an interface, shown as interface 354. As shown in FIGS. 3A-3C, the rods 352 are selectively extendable from and retractable into the cylinders 350 such that the interfaces 354 selectively engage corresponding contact points, shown as contact points 392, positioned along the axles 150. In some embodiments, the interfaces 354 and/or the contact points 392 are manufactured from a rigid material (e.g., metal, steel, etc.). In some embodiments, the interfaces 354 and/or the contact points 392 are manufactured from a compliant material (e.g., hard rubber, etc.) such that the interfaces 354 and the contact points 392 engage with the faces thereof parallel with each other (e.g., to increase the area of engagement therebetween when the axles 150 are pivoted about the central axis 26 into a non-nominal position, to reduce wear, etc.). In some embodiments, the interfaces 354 and/or the contact points 392 freely pivot such that the interfaces 354 and the contact points 392 engage with the faces thereof parallel with each other (e.g., to increase the area of engagement therebetween when the axles 150 are pivoted about the central axis 26 into a non-nominal position, etc.). In an alternative embodiment, the interfaces 354 of the rods 352 are coupled (e.g., pined, etc.) to the contact points 392 of the axles 150.

As shown in FIGS. 3A-3B, the rods 352 of the front left actuator 310, the front right actuator 320, the rear left actuator 330, and the rear right actuator 340 are retracted such that the interfaces 354 are disengaged from the contact points 392 and the axles 150 freely pivot about the central axis 26. As shown in FIG. 3C, the rods 352 of the front left actuator 310, the front right actuator 320, the rear left actuator 330, and the rear right actuator 340 are extended such that the interfaces 354 are engaged with the contact points 392. In such an arrangement, the front left actuator 310, the front right actuator 320, the rear left actuator 330, and the rear right actuator 340 may be extended to (i) lock the axles 150 at a desired angle and/or (ii) actively/adaptively control the angle of the axles 150. In some embodiments, the front left actuator 310, the front right actuator 320, the rear left actuator 330, and the rear right actuator 340 are controlled such that one of the axles 150 is free to pivot and the other of the axles 150 is locked. In some embodiments, the front left actuator 310, the front right actuator 320, the rear left actuator 330, and the rear right actuator 340 are controlled such that one of the axles 150 is free to pivot and the other of the axles 150 is actively controlled (i.e., the angle thereof). In some embodiments, the front left actuator 310, the front right actuator 320, the rear left actuator 330, and the rear right actuator 340 are controlled such that one of the axles 150 is locked and the other of the axles 150 is actively controlled (i.e., the angle thereof).

In some embodiments, the front left actuator 310, the front right actuator 320, the rear left actuator 330, and/or the rear right actuator 340 are extended a selected distance such that the rods 352 do not engage the contact points 392, but act as stops that limit the pivot range of the axles 150. By way of example, when the rods 352 are fully retracted, the axles 150 may pivot through a first angle range (e.g., from −10 degrees to +10 degrees, from −15 to +15 degrees, from −8 degrees to +8 degrees, from −5 to +5 degrees, etc. about the central axis 26); however, the rods 352 may be partially extended to function as bump stops that effectively limit the pivot range from the first angle range to a second angle range that is less than the first angle range. In some embodiments, (i) the rods 352 of the front left actuator 310 and/or the rear left actuator 330 are extended a first distance and (ii) the rods 352 of the front right actuator 320 and/or the rear right actuator 340 are extended a second distance different than the first distance such that the axles 150 pivot a different amount to the left than the right. In some embodiments, (i) the rods 352 of the front left actuator 310 and/or the front right actuator 320 are extended a first distance and (ii) the rods 352 of the rear left actuator 330 and/or the rear right actuator 340 are extended a second distance different than the first distance such that the front axle of the axles 150 pivots a different amount than the rear axle of the axles 150.

As shown in FIGS. 3A-3C, the leveling system 300 includes various sensors, shown as front left load sensor 360, front right load sensor 362, rear left load sensor 364, rear right load sensor 366, and tilt sensor 370. As shown in FIGS. 3A-3C, the tilt sensor 370 is positioned on and/or within the lift base 20. According to an exemplary embodiment, the tilt sensor 370 is configured to acquire tilt data to facilitate monitoring a tilt angle (e.g., a roll angle, a pitch angle, etc.) of the lift base 20. The tilt sensor 370 may be or include a gyroscope, an accelerometer, an inclinometer, and/or still another suitable sensor to measure the tilt angle of the lift base 20.

As shown in FIGS. 3A-3C, the front left load sensor 360 is directly coupled to (e.g., integrated into, etc.) the front axle of the axles 150, between (i) the front left actuator 310 (and the contact point 392 associated therewith) and (ii) the tractive element 16 associated with the front left of the lift device 10. As shown in FIGS. 3A-3C, the front right load sensor 362 is directly coupled to (e.g., integrated into, etc.) the front axle of the axles 150, between (i) the front right actuator 320 (and the contact point 392 associated therewith) and (ii) the tractive element 16 associated with the front right of the lift device 10. As shown in FIGS. 3A-3C, the rear left load sensor 364 is directly coupled to (e.g., integrated into, etc.) the rear axle of the axles 150, between (i) the rear left actuator 330 (and the contact point 392 associated therewith) and (ii) the tractive element 16 associated with the rear left of the lift device 10. As shown in FIGS. 3A-3C, the rear right load sensor 366 is directly coupled to (e.g., integrated into, etc.) the rear axle of the axles 150, between (i) the rear right actuator 340 (and the contact point 392 associated therewith) and (ii) the tractive element 16 associated with the rear right of the lift device 10. In some embodiments, the leveling system 300 (i) does not include the front left load sensor 360 and the front right load sensor 362 or (ii) does not include the rear left load sensor 364 and the rear right load sensor 366. According to an exemplary embodiment, the front left load sensor 360, the front right load sensor 362, the rear left load sensor 364, and the rear right load sensor 366 are configured to acquire load/strain data to facilitate monitoring a load on and/or stain within different portions of the axles 150. The front left load sensor 360, the front right load sensor 362, the rear left load sensor 364, and the rear right load sensor 366 may be or include strain gauges/sensors and/or still another suitable sensor to measure the load on and/or strain within the axles 150.

Leveling Systems with Limited Rocking

Referring to FIGS. 4-5B, 6-7B, and 8, the lift device 10 can include a leveling system 400, a leveling system 500, or a leveling system 600. The leveling system 400, the leveling system 500, or the leveling system 600 may be similar to the leveling system 300 and can facilitate leveling the lift base 20 relative to the axle 150, or can facilitate improved oscillation control of the lift base 20 relative to the axle 150. The leveling system 400, the leveling system 500, or the leveling system 600 can allow a predetermined or limited amount of relative rotation or pivoting between the axle 150 and the lift base 20. The axle 150 can define an axis 151. Any of the leveling system 400, the leveling system 500, or the leveling system 600 may be implemented as the front leveling system 200a or the rear leveling system 200b, or both. It should be understood that any combination of the leveling system 300, the leveling system 400, the leveling system 500, or the leveling system 600 may be implemented as the front leveling system 200a and the rear leveling system 200b. For example, the leveling system 300 may be implemented in the lift device 10 as the rear leveling system 200b, while the leveling system 400 is implemented as the front leveling system 200a. In another embodiment, the leveling system 300 is implemented in the lift device 10 as the rear leveling system 200b, while the leveling system 500 is implemented in the lift device 10 as the front leveling system 200a. The leveling systems 400, 500, and 600 may be leveling systems that are configured to allow a limited amount of relative rotation between the axle 150 and the lift base 20.

Figure 4:
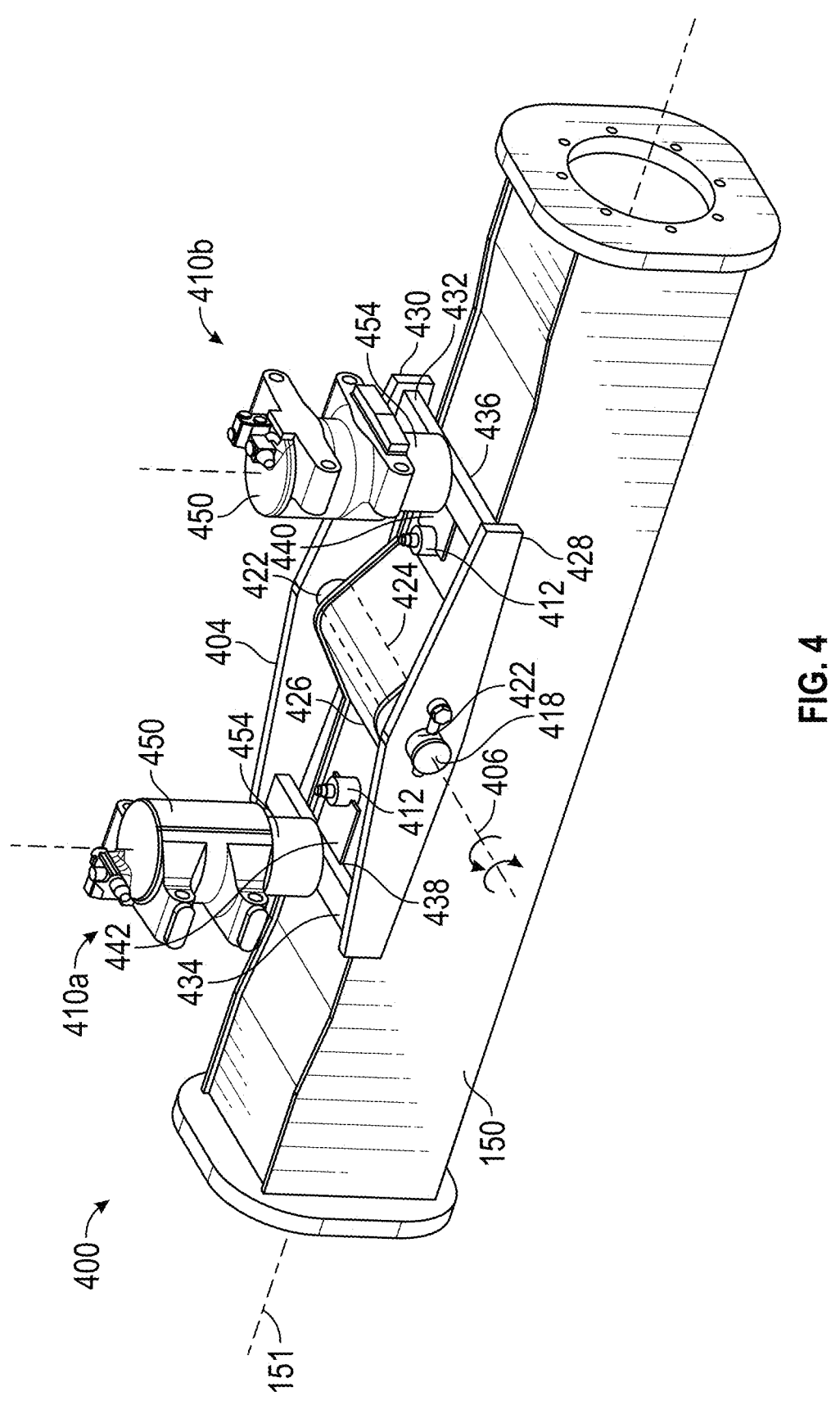
FIG. 4 is a perspective view of a second leveling system that may be implemented as one of the front leveling system or the rear leveling system of the lift devices of FIGS. 1-2, according to an exemplary embodiment.

As shown in FIG. 4, the leveling system 400 includes the axle 150, a frame, carriage, pivotal member, intermediate rocker, etc., shown as cradle 404, a first actuator 410a, and a second actuator 410b. The axle 150 pivotally or rotatably couples with the cradle 404 through a pin 418. The pin 418 may extend through apertures 422 on opposite longitudinal sides (e.g., a front and rear side) of the cradle 404 and an inner volume, bore, opening, hole, etc., shown as bore 424 of the axle 150. The bore 424 may be formed in or extend through a protrusion, a ridge, an extension, etc., shown as protrusion 426 of the axle 150. The pin 418 facilitates relative rotation between the cradle 404 and the axle 150. The pin 418 may be pinned or fixedly coupled with the cradle 404 to limit relative rotation between the pin 418 and the cradle 404.

The cradle 404 includes a pair of first members 428 and 430, and a pair of second members 432 and 434. The first members 428 and 430 may extend in a lateral direction of the axle 150 (e.g., in a direction parallel with or along the axis 151). The first members 428 and 430 can be spaced apart on opposite sides of the axle 150 (e.g., front and rear sides of the axle 150). The second members 432 and 434 extend between the first members 428 and 430 at ends of the first members 428 and 430. For example, the second member 432 is shown to extend between the first members 428 and 430 at a first end of the first members 428 and 430, and the second member 434 is shown to extend between the first members 428 and 430 at a second end of the first members 428 and 430. The first members 428 and 430 can define or include the apertures 422 at a centerpoint.

The second members 432 and 434 can each define a corresponding contact or engagement surface, shown as contact surface 436 and contact surface 438. The contact surface 436 and the contact surface 438 can be configured to engage, abut, directly contact, touch, etc., corresponding surfaces or areas of the axle 150. In some embodiments, the cradle 404 is configured to pivot so that either the contact surface 436 or the contact surface 438 engages, abuts, contacts, etc., the axle 150, but the contact surface 436 and the contact surface 438 do not both contact the axle 150 concurrently or simultaneously.

The second members 432 and 434 can also include corresponding plates, extensions, shown as extensions 440 and 442. The extensions 440 and 442 extend inwards (e.g., towards the pin 418) and are configured to engage corresponding sensors 412 (e.g., force sensors, strain gauges, position sensors, etc.). The sensors 412 can be strain gauges that are configured to measure an amount of force applied to the cradle 404 on either lateral side of the cradle 404 (e.g., an amount of force applied to the cradle 404 at the second member 432 or an amount of force applied to the cradle 404 at the second member 434).

The lift base 20 of the lift device 10 may rotatably or pivotally couple with the pin 418. For example, the lift base 20 of the lift device 10 may be rotatably or pivotally coupled with the pin 318 through a trunnion mount. A member of the lift base 20 can extend between the axle 150 and the cradle 404 (e.g., between an interior surface of the first member 430 and an exterior surface of the axle 150) and pivotally couple with the pin 418. The pin 418 can define an axis 406 about which the axle 150 can rotate relative to the cradle 404 and the lift base 20, even when the first actuator 410a and the second actuator 410b are fully extended to limit relative rotation between the cradle 304 and the lift base 20.

The first actuator 410a and the second actuator 410b can be the same as or similar to the front right actuator 320 or the rear right actuator 340, and the front left actuator 310 or the rear left actuator 330, respectively, and may be operated similarly. However, the first actuator 410a and the second actuator 410b are configured to engage, directly contact, abut, etc., opposite ends of the cradle 404 as opposed to contacting, engaging, abutting, etc., the axle 150. The first actuator 410a and the second actuator 410b can be operated to provide leveling of the lift base 20 relative to the axle 150, while allowing limited relative rotation between the axle 150 and the cradle 404, thereby allowing limited relative rotation between the axle 150 and the lift base 20.

The sensors 412 (e.g., a first sensor 412a and a second sensor 412b) may be configured to measure an amount of strain, deformation, displacement, etc., present at opposite lateral ends of the cradle 404 (e.g., at a first end of the cradle 404 where the first actuator 410a is positioned, or at a second end of the cradle 404 where the second actuator 410b is positioned). The first actuator 410a and the second actuator 410b each include a body, shown as cylinder 450, and a rod 454 that is configured to be driven to extend or retract relative to the cylinder 450. The cylinder 450 may be the same as or similar to the cylinder 350 and the rod 454 may be the same as or similar to the rod 352.

Figure 5A:
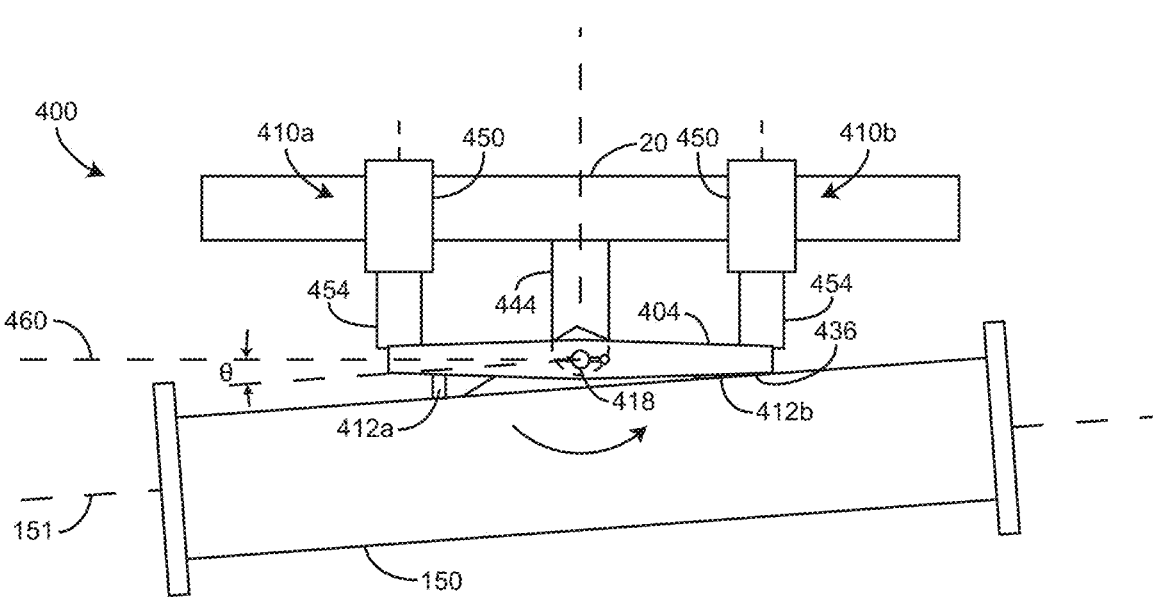
FIGS. 5A-5B are various front views of the second leveling system of FIG. 4, according to an exemplary embodiment.
Figure 5B:
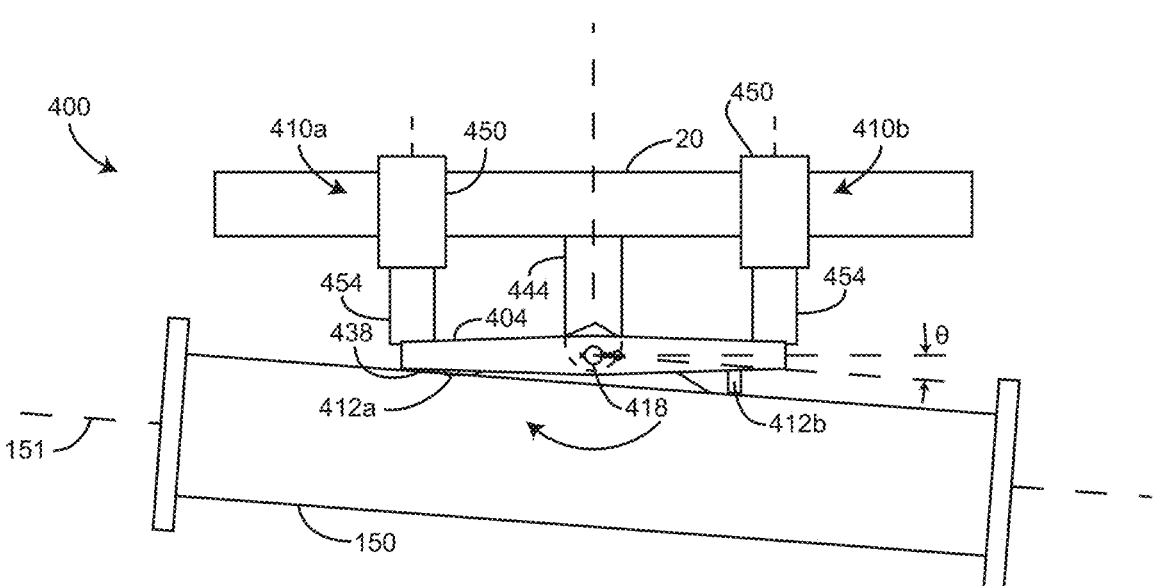

Referring to FIGS. 5A-5B, the leveling system 400 is shown when the first actuator 410a and the second actuator 410b are locked out or extended fully to engage the cradle 404 (e.g., so that the rods 454 engage the cradle 404). When the first actuator 410a and the second actuator 410b are fully extended to engage the cradle 404, the cradle 404 and the axle 150 can still rotate relative to each other by a limited amount. For example, as shown in FIG. 5A, the axle 150 may rotate relative to the cradle 404 and the lift base 20 in a counter-clockwise direction about the pin 418 (e.g., about the axis 406 defined by the pin) until the axle 150 abuts, engages, contacts, etc., the contact surface 436 of the cradle 404. The axle 150 may be limited to rotate an angular amount θ in either a clockwise or a counter-clockwise direction as defined between a lateral axis 460 of the lift device 10 or the lift base 20 and the axis 151 of the axle 150. For example, as shown in FIG. 5B, the axle 150 may rotate in a clockwise direction an angular amount θ until the axle 150 abuts, engages, directly contacts, etc., the cradle 304 (e.g., until the axle 150 abuts the contact surface 438 of the cradle 404). The first actuator 410a and the second actuator 410b can thereby be controlled to provide leveling, roll stability, etc., by engaging the cradle 404. The leveling system 400 still allows a limited amount of relative rotation between the lift base 20 and the axle 150. Some amount of relative rotation between the lift base 20 and the axle 150 may be desirable for load and stability sensing purposes (e.g., so that the sensors 412 can detect load and roll of the axle 150 relative to the lift base 20). In this way, the cradle 404 may rock in either direction about the axis 406 defined by the pin 418 until contacting the axle 150 at either of the contact surface 436 or the contact surface 438. The lift base 20, the first actuator 410a and the second actuator 410b can rock or rotate in unison with the cradle 404 relative to the axle 150 (e.g., if the first actuator 410a and the second actuator 410b are locked out, or fully extended to engage the cradle 404).

The lift base 20 may rotate or pivot relative to the cradle 404 through operation of the first actuator 410a and the second actuator 410b. For example, the lift base 20 may rotate or pivot relative to the cradle 404 about the pin 418 in a clockwise direction if the second actuator 410b is retracted while the first actuator 410a is extended. In this way, any of the functionality of the leveling system 300 may be implemented or performed by the leveling system 400 but with an intermediate rotatable member (e.g., the cradle 404) to allow limited relative rotation between the axle 150 and the lift base 20 even when the first actuator 410a and the second actuator 410b are locked out. In some embodiments, the first actuator 410a and the second actuator 410b can be operated (e.g., by a control system such as lift device control system 900 as described in greater detail below) to achieve a desired relative rotational orientation between the axle 150 and the lift base 20. Once the desired relative rotational orientation between the axle 150 and the lift base 20 is achieved (e.g., by operating the first actuator 410a and the second actuator 410b to engage the cradle 404 so that the desired relative rotational orientation between the axle 150 and the lift base 20 is achieved), the axle 150 may still be free to rotate or pivot a limited amount relative to the lift base 20 through rocking of the cradle 404.

As shown in FIGS. 5A-5B, the leveling system 400 includes an intermediate member, an elongated member, a protrusion, a linkage, etc., shown as pivot 444. The pivot 444 may fixedly couple with the lift base 20 (e.g., being integrally formed, welded, fastened, etc.) and pivotally or rotatably couple with the pin 418 (e.g., at opposite ends of the pivot 444). In this way, the lift base 20 can be coupled with the axle 150 so that the lift base 20 is supported by and rotatable relative to the axle 150. The first actuator 410a and the second actuator 410b are fixedly coupled with the lift base 20. The first actuator 410a and the second actuator 410b can be the same or similar to the front left actuator 310, the front right actuator 320, the rear left actuator 330, or the rear right actuator 340, and may include cylinders (e.g., body members, such as cylinders 350), rods configured to translate relative to the cylinders (e.g., rods 352), and interfaces (e.g., interfaces 354).

Figure 6:
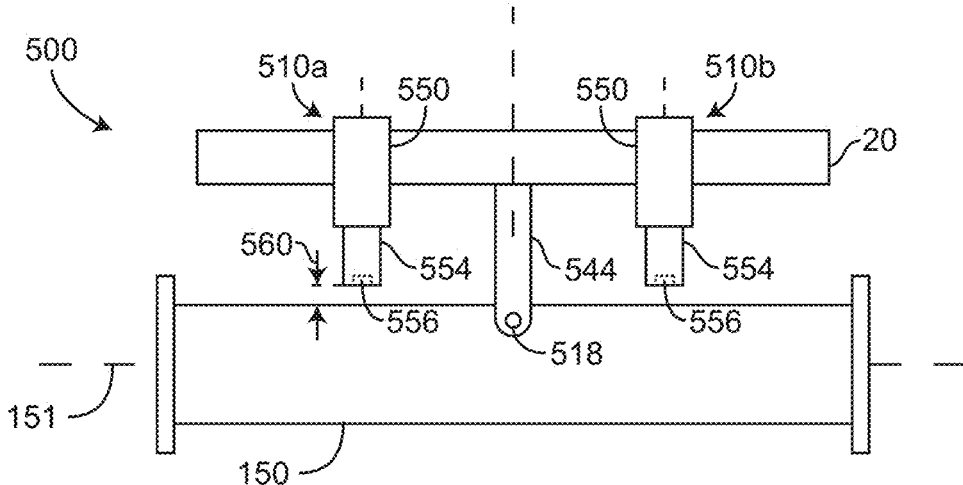
FIG. 6 is a diagram of a third leveling system that may be implemented as one of the front leveling system or the rear leveling system of FIGS. 1-2, according to an exemplary embodiment.

Referring now to FIG. 6, the leveling system 500 includes a first actuator 510a, a second actuator 510b, the lift base 20, and the axle 150. The leveling system 500 can be similar to the leveling system 400 and may have a similar configuration. For example, the first actuator 510a and the second actuator 510b can be the same as or similar to the first actuator 410a and the second actuator 410b (e.g., being fixedly coupled with the lift base 20, including a body 550 and a rod 554, etc.). The axle 150 and the lift base 20 can be coupled through a pivot 544 that may be the same as or similar to the pivot 444. For example, the pivot 544 may rotatably or pivotally couple with the axle 150 through a pin 518 and may be fixedly coupled with the lift base 20. In other embodiments, the pivot 544 is pivotally or rotatably coupled with the lift base 20 (e.g., through a pin) and fixedly coupled with the axle 150.

The rods 554 each include a distance sensor 556 that is configured to measure a distance between an end of the rods 554 and an exterior surface of the axle 150. The distance sensor 556 can be an infrared (IR) sensor, an inductive proximity sensor, a capacitive proximity sensor, a photoelectric proximity sensor, an ultrasonic proximity sensor, etc. The distance sensor 556 can provide a currently measured distance between the exterior surface of the axle 150 and the end of the rod 554 to a control system or a controller. The first actuator 510a and the second actuator 510b can be operated to extend while the currently measured distance as obtained by the distance sensors 556 is monitored. The distance sensors 556 can be fixedly coupled or mounted at an outer end of the rods 554 so that the distance sensors 556 can measure the distance between the ends of the rods 554 and the exterior surface of the axle 150. The first actuator 510a and the second actuator 510b can be operated to extend until the currently measured distance is equal to a predetermined distance value, thereby indicating that the ends of the rods 554 are a predetermined distance 560 from the exterior surface of the axle 150. Once the ends of the rods 554 are the predetermined distance 560 from the exterior surface of the axle 150, the leveling system 500 can be operated similarly to the leveling system 400.

Figure 7A:
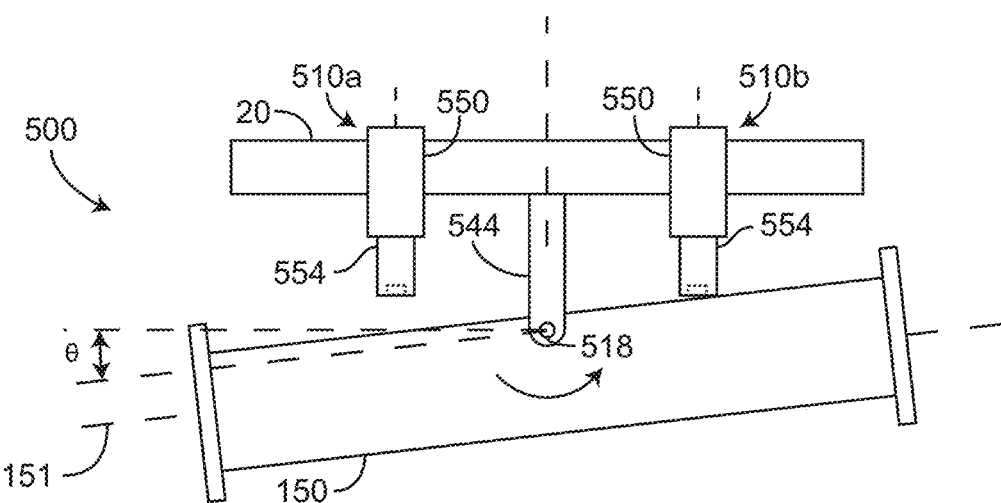
FIGS. 7A-7B are various front views of the third leveling system of FIG. 6, according to an exemplary embodiment.
Figure 7B:
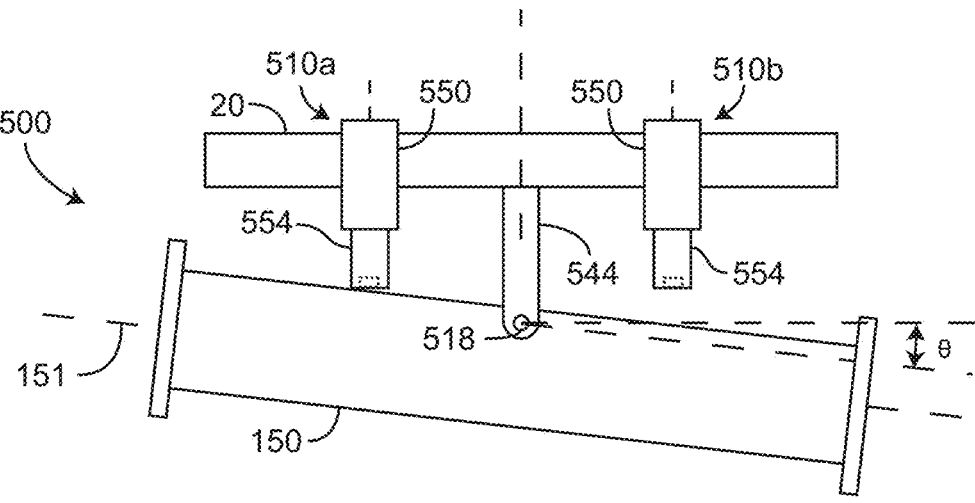

With the first actuator 510a and the second actuator 510b are configured so that the predetermined distance 560 is formed between the ends of the rods 554 and the exterior surface of the axle 150, the axle 150 may rotate or pivot relative to the lift base 20 a limited angular amount as shown in FIGS. 7A-7B. For example, the axle 150 may rotate about the pin 518 in a counter-clockwise direction until the rod 554 of the second actuator 510b directly contacts, abuts, engages, etc., the exterior surface of the axle 150 (shown in FIG. 7A), thereby limiting further rotation in the counter-clockwise direction. Similarly, the axle 150 may rotate about the pin 518 in a clockwise direction until the rod 554 of the first actuator 510a abuts, contacts, engages, etc., the exterior surface of the axle 150 (shown in FIG. 7B), thereby limiting further rotation in the clockwise direction. It should be understood that after the first actuator 510a and the second actuator 510b are configured so that the predetermined distance 560 between the rods 554 and the exterior surface of the axle 150 is achieved, the first actuator 510a and the second actuator 510b can be operated similarly to or the same as the any of the first actuator 410a and the second actuator 410b, the front right actuator 320 and the front left actuator 310, or the rear right actuator 340 and the rear left actuator 330, to provide leveling, roll stability, etc., as described herein.

Figure 8:
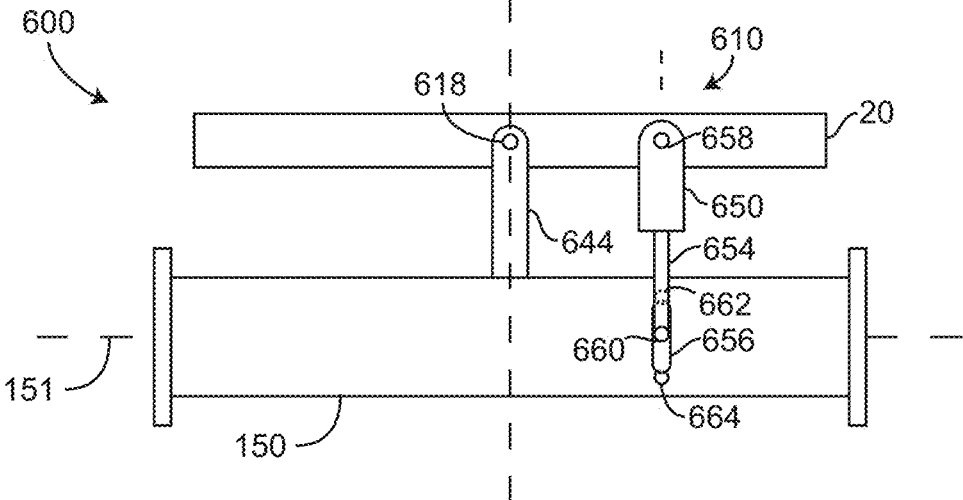
FIG. 8 is a diagram of a fourth leveling system that may be implemented as one of the front leveling system or the rear leveling system of FIGS. 1-2, according to an exemplary embodiment.

Referring to FIG. 8, the leveling system 600 includes the lift base 20, the axle 150, and an actuator 610. The lift base 20 is rotatably or pivotally coupled with the axle 150 through a pivot 644. The pivot 644 is fixedly coupled with the axle 150 and rotatably or pivotally coupled with the lift base 20 through a pivot pin 618. The lift base 20 may rotate relative to the axle 150 about the pivot pin 618.

The actuator 610 can be similar to the actuators 510, and may include a body 650 and a rod 654 that is configured to translate (e.g., to extend or retract) relative to the body 650. The body 650 of the actuator 610 is rotatably or pivotally coupled with the lift base 20 at pin 658 so that the actuator 610 can rotate or pivot relative to the lift base 20. An outer end of the rod 654 is received within a slot 656 of the axle 150. Specifically, the outer end of the rod 654 can include a follower 660 (e.g., a pin) that is configured to ride along, translate within, etc., the slot 656 along a length of the slot 656. The actuator 610 can be configured to pivot or rotate relative to the lift base 20 at a first end (about the pin 658) and pivot or rotate relative to the axle 150 at a second end (about the follower 660). The length of the slot 656 can control or limit an amount of relative rotation or rocking between the lift base 20 and the axle 150.

The actuator 610 can be operated to extend or retract to achieve a desired relative orientation between the lift base 20 and the axle 150. For example, operating the actuator 610 to extend (e.g., so that the rod 654 translates out of the body 650) may cause the lift base 20 to rotate in a counter-clockwise direction relative to the axle 150 (e.g., about the pivot pin 618), thereby adjusting the relative orientation between the lift base 20 and the axle 150. Similarly, oper-ating the actuator 610 to retract (e.g., so that the rod 654 translates into the body 650) may cause the lift base 20 to rotate in a clockwise direction relative to the axle 150, thereby adjusting the relative orientation between the lift base 20 and the axle 150.

Once the actuator 610 is operated to achieve the desired relative orientation between the lift base 20 and the axle 150, the lift base 20 can rock or rotate relative to the axle 150 through translation of the follower 660 along the slot 656. An amount of extension or retraction of the actuator 610 can achieve a desired relative orientation $\theta$ between the lift base 20 and the axle 150, while translation of the follower 660 along the slot 656 results in an angular amount $\Delta\theta$ that the lift base 20 can rotate or pivot relative to the axle 150 when the desired relative orientation $\theta$ is achieved. In this way, the lift base 20 and the axle 150 can have a relative angular orientation of $\theta+/-\Delta\theta$ where $\theta$ results from and is controlled by operation of the actuator 610, and $\Delta\theta$ results from and is limited by the length of the slot 656, or a distance that the follower 660 can translate along the slot 656. Advanta-geously, the leveling system 600 facilitates achieving desired relative orientation between the lift base 20 and the axle 150, while also allowing a limited amount of rocking or relative rotation between the lift base 20 and the axle 150.

It should be understood that while the actuator 610 is shown pinned with the lift base 20 and slidably and rotatably coupled at an opposite end through the follower 660 that translates within the slot 656 of the axle 150, the configu-ration may be reversed so that the actuator 610 is pinned with the axle 150 and the opposite end of the actuator 610 slidably and rotatably couples with lift base 20 through the slot 656 that is positioned on the lift base 20. Additionally, while FIG. 8 shows only one actuator 610 on one side of the pivot pin 618, another actuator may be provided on an opposite side of the pivot pin 618, with a similar slot 656 and follower 660.

Referring still to FIG. 8, the leveling system 600 includes a first sensor 662 and a second sensor 664 positioned at opposite ends of the slot 656. The first sensor 662 and the second sensor 664 can be strain gauges, force sensors, conductive sensors, etc., or any other sensor configured to detect when the follower 660 contacts or engages one of the first sensor 662 or the second sensor 664. In this way, feedback from the first sensor 662 and/or the second sensor 664 can indicate whether or not the follower 660 of the actuator 610 is at either end of the slot 656. In this way, feedback from the sensors 662 and/or 664 can indicate if the relative orientation between the lift base 20 and the axle 150 is $\theta+\Delta\theta$ or $\theta-\Delta\theta$.

It should be understood that any of the leveling system 400, the leveling system 400, or the leveling system 500 may be operated similarly to or the same as the leveling system 300 as described throughout the present disclosure. The leveling system 400, the leveling system 500, or the leveling system 600 may be similar to the leveling system 300 but facilitate a limited amount of relative rotation between the lift base 20 and the axle 150. The leveling system 400, the leveling system 500, or the leveling system 600 may also include any of the sensors, actuators, etc., of the leveling system 300. For example, the leveling system 400, the leveling system 500, or the leveling system 600 may include any load sensors (e.g., the front left load sensor 360, the rear left load sensors 364, the front right load sensor 362, the rear right load sensor 366) or tilt sensors (e.g., the tilt sensor 370) of the leveling system 300. Further, while the leveling system 400, the leveling system 500, and the leveling system 600 are described herein with reference to a single axle (e.g., the axle 150), any of or any combination of the leveling system 400, the leveling system 500, or the leveling system 600 can be implemented on front and rear axles 150 of the lift device 10.

Control System

Figure 9:
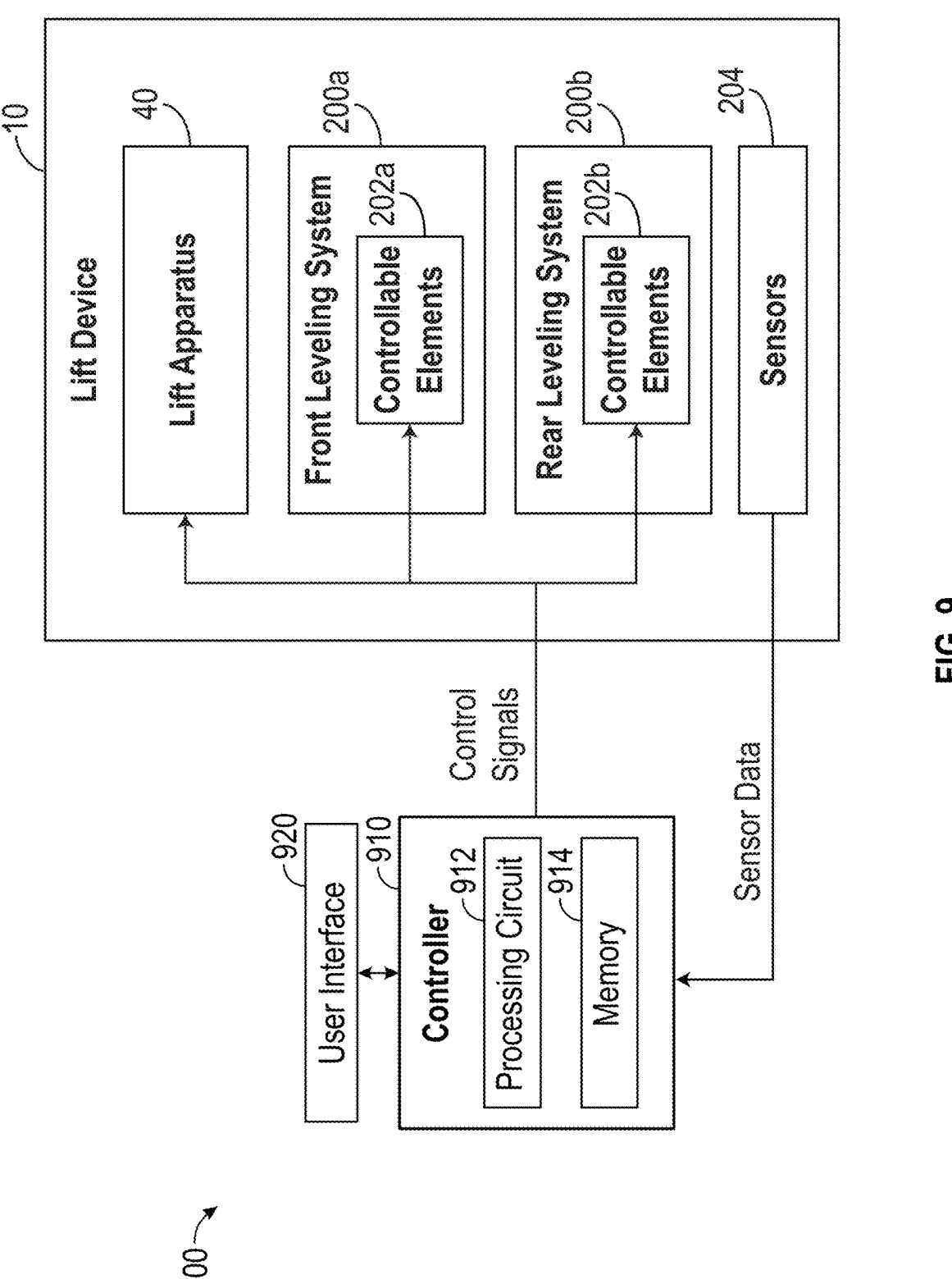
FIG. 9 is a block diagram of a control system for operating the front leveling system and/or the rear leveling system of FIGS. 1-2, according to an exemplary embodiment.

As shown in FIG. 1, the lift device 10 includes a control system, shown as lift device control system 900. As shown in FIG. 9, the lift device control system 900 includes a control module, shown as controller 910. In one embodi-ment, the controller 910 is configured to selectively engage, selectively disengage, control, and/or otherwise communi-cate with components of the lift device 10 (e.g., actively control the components thereof, etc.). As shown in FIG. 9, the controller 910 is communicably coupled with the lift device 10, and a user interface 920. Specifically, the con-troller 910 can be communicably coupled with controllable elements 202a of the front leveling system 200a, control-lable elements 202b of the rear leveling system 200b, and sensors 204 of the lift device 10. In other embodiments, the controller 910 is coupled to more or fewer components. By way of example, the controller 910 may send and receive signals (e.g., sensor data, sensor signals, control signals, etc.) with the controllable elements 202a of the front level-ing system 200a, controllable elements 202b of the rear leveling system 200b, the sensors 204, and/or the user interface 920. The controller 910 may be configured to operate any of the front leveling system 200a and/or the rear leveling system 200b in various modes and/or control any of the front leveling system 200a and/or the rear leveling system 200b to maintain the lift base 20, and/or the lift apparatus 40 level relative to gravity or at a desired orien-tation relative to the axles 150.

The controller 910 may be implemented as a general-purpose processor, an application specific integrated circuit (ASIC), one or more field programmable gate arrays (FP-GAs), a digital-signal-processor (DSP), circuits containing one or more processing components, circuitry for supporting a microprocessor, a group of processing components, or other suitable electronic processing components. According to the exemplary embodiment shown in FIG. 9, the control-ler 910 includes a processing circuit 912 and a memory 914. The processing circuit 912 may include an ASIC, one or more FPGAs, a DSP, circuits containing one or more pro-cessing components, circuitry for supporting a microproces-sor, a group of processing components, or other suitable electronic processing components. In some embodiments, the processing circuit 912 is configured to execute computer code stored in the memory 914 to facilitate the activities described herein. The memory 914 may be any volatile or non-volatile computer-readable storage medium capable of storing data or computer code relating to the activities described herein. According to an exemplary embodiment, the memory 914 includes computer code modules (e.g., executable code, object code, source code, script code, machine code, etc.) configured for execution by the processing circuit 912. In some embodiments, controller 910 represents a collection of processing devices (e.g., servers, data centers, etc.). In such cases, the processing circuit 912 represents the collective processors of the devices, and the memory 914 represents the collective storage devices of the devices.

In one embodiment, the user interface 920 includes a display and an operator input. The display may be configured to display a graphical user interface, an image, an icon, and/or still other information. In one embodiment, the display includes a graphical user interface configured to provide general information about the lift device 10 (e.g., speed, fuel level, warning lights, battery level, etc.). The graphical user interface may also be configured to display a current position of any of the front leveling system 200a, the rear leveling system 200b, a current position of the lift apparatus 40, an orientation of the lift base 20 (e.g., angle relative to a ground surface, etc.), stability characteristics of the lift base 20, and/or still other information relating to the lift device 10 and/or any of the front leveling system 200a and the rear leveling system 200b.

The front leveling system 200a may be any of the leveling system 300, the leveling system 400, or the leveling system 500, or the leveling system 600, and the controllable elements 202a are the controllable elements (e.g., actuators) thereof. For example, if the front leveling system 200a is the leveling system 300, the controllable elements 202a may be the front right actuator 320 and the front left actuator 310. If the front leveling system 200a is the leveling system 400, the controllable elements 202a are the actuators 410. If the front leveling system 200a is the leveling system 500, the controllable elements 202a are the actuators 510. If the leveling system 200a is the leveling system 600, the controllable elements 202s are the actuator 610. Similarly, the rear leveling system 200b may be any of the leveling system 300, the leveling system 400, the leveling system 500, or the leveling system 600. If the rear leveling system 200b is the leveling system 300, the controllable elements 202b are the rear right actuator 340 and the rear left actuator 330. If the rear leveling system 200b is the leveling system 400, the controllable elements 202b are the actuators 410. If the rear leveling system 200b is the leveling system 500, the controllable elements 202b are the actuators 510. If the rear leveling system 200b is the leveling system 600, the controllable elements 202b are the actuator 610.

Similarly, the sensors 204 can be or include sensors of the lift device 10 or any of the leveling system 300, the leveling system 400, the leveling system 500, or the leveling system 600 (e.g., the front left load sensor 360, the front right load sensor 362, the rear left load sensor 364, the rear right load sensor 366, the tilt sensor 370, the sensors 412, the distance sensors 556, the sensors 662 and 664, etc.), or any combination thereof. The sensors 204 provide sensor data to the controller 910 for use in determining or generating the control signals for the controllable elements 202a of the front leveling system 200a and the controllable elements 202b of the rear leveling system 200b.

The operator input may be used by an operator to provide commands to any of the lift device 10, the lift apparatus 40, the front leveling system 200a, or the rear leveling system 200b. The operator input may include one or more buttons, knobs, touchscreens, switches, levers, joysticks, pedals, a steering wheel, or handles. The operator input may facilitate manual control of some or all aspects of the operation of the lift device 10. It should be understood that any type of display or input controls may be implemented with the systems and methods described herein.

Figure 11:
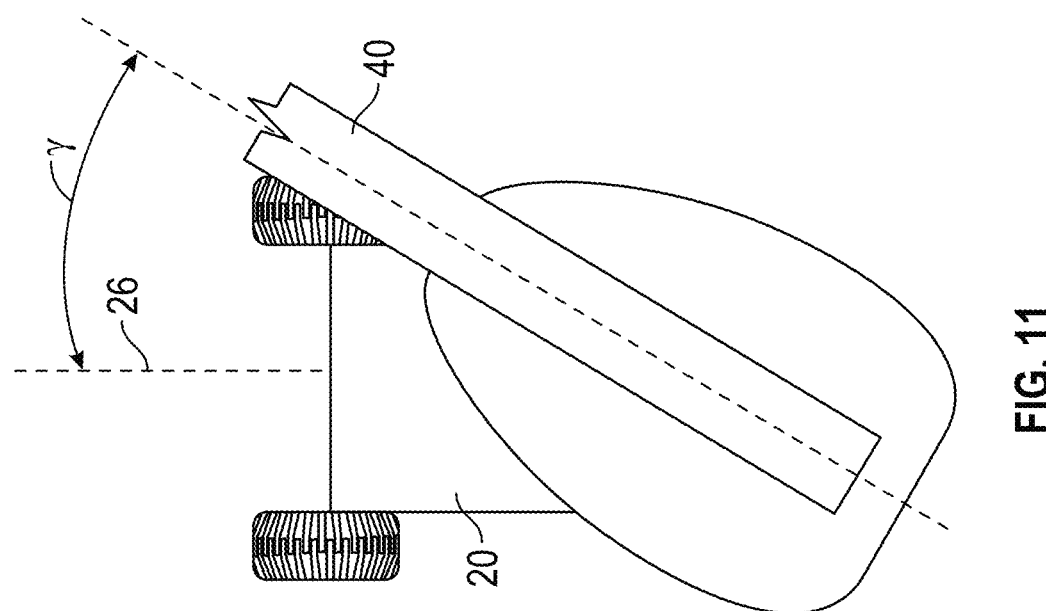
FIG. 11 is a top view of the lift device of FIG. 1 with the lift apparatus at a yaw angle, according to an exemplary embodiment.
Figure 10:
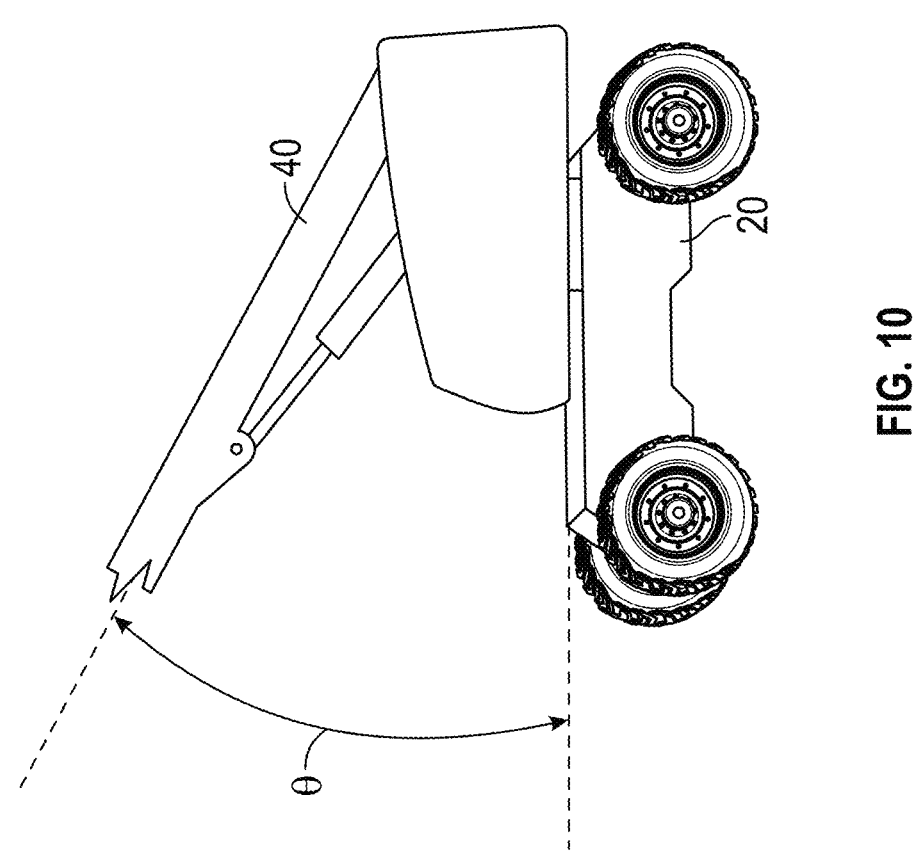
FIG. 10 is a side view of the lift device of FIG. 1 with a lift apparatus at an elevation angle, according to an exemplary embodiment.

As shown in FIGS. 10 and 11, the controller 910 is configured to monitor (i) a first angle or elevation angle, shown as angle $\theta$, of the lift apparatus 40 pivoted above horizontal and (ii) a second angle or yaw angle, shown as angle $\gamma$, of the lift apparatus 40 rotated relative to the central axis 26. According to an exemplary embodiment, the controller 910 is configured to (i) monitor (a) the tilt data acquired by the tilt sensor 370, (b) the load/strain data acquired by the front left load sensor 360, the front right load sensor 362, the rear left load sensor 364, the rear right load sensor 366, and/or (c) the position of the lift apparatus 40 (e.g., relative to a nominal, stowed position; the angle $\theta$ and the angle $\gamma$; etc.) and (ii) control any of the front leveling system 200a or the rear leveling system 200b.

The controller 910 may be configured to operate any of the front leveling system 200a or the rear leveling system 200b in various modes based on the tilt data, the load/strain data, the position of the lift apparatus 40, and/or whether the lift device 10 is being driven or is stationary. By way of example, the controller 910 may be configured to operate any of the front leveling system 200a or the rear leveling system 200b in a first mode or a free oscillation mode in response to (i) the lift apparatus 40 being "in-transport" or positioned at an angle $\theta$ less than or equal to a first angle threshold (e.g., zero degrees, five degrees, etc.), (ii) the lift apparatus 40 being centered on the central axis 26 (e.g., positioned between the front two or rear two tractive elements 16, etc.) or positioned at an angle $\gamma$ less than or equal to a second angle threshold (e.g., zero degrees, five degrees, ten degrees, fifteen degrees, etc.), and/or (iii) the lift device 10 being driven. In the free oscillation mode, the controller 910 may be configured to (i) retract the rods 352 or (ii) allow the rods 352 to float with the axles 150 such that the front axle and/or the rear axle of the axles 150 (depending on whether both are pivoting axles) are free to pivot about the central axis 26. The free oscillation mode allows the tractive elements 16 to remain in contact with the ground as the lift device 10 drives over uneven terrain (e.g., to substantially prevent a three-wheeling situation, etc.). In some embodiments, one of the front axle or the rear axle of the axles 150 is locked (if both are pivoting axles) during the free oscillation mode. In some embodiments, the oscillating range of the axles 150 is limited by the controller 910 during the free oscillation mode (e.g., by extending the rods 352 to function as bump stops, based on a current speed of the lift device 10, etc.).

By way of another example, the controller 910 may be configured to operate any of the leveling system 200, the leveling system 400, the leveling system 300, or the leveling system 400 in a second mode or an active control mode in response to (i) the lift apparatus 40 being "out-of-transport" or positioned at an angle $\theta$ greater than the first angle threshold, (ii) the turntable 30 and the lift apparatus 40 not being centered on the central axis 26 or positioned at an angle $\gamma$ greater than the second angle threshold, and/or (iii) the lift device 10 being driven. In the active mode, the controller 910 may be configured to (i) extend and retract the rods 352 such that the interfaces 354 engage the contact points 392 and (ii) actively control the pivot angle of the axles 150 about the central axis 26 to level the lift device 10 (e.g., based on the tilt data and the load/strain data; as the lift apparatus 40 is repositioned; as the lift device 10 is driven; etc.). In some embodiments, one of the front axle or the rear axle of the axles 150 is locked (if both are pivoting axles) during the active mode.

By way of still another example, the controller 910 may be configured to operate any of the front leveling system 200a or the rear leveling system 200b in a third mode or a locking mode in response to (i) the lift apparatus 40 being "in-transport" or positioned at an angle θ less than or equal to the first angle threshold, (ii) the lift apparatus 40 being centered on the central axis 26 or positioned at an angle γ less than or equal to the second angle threshold, and (iii) the lift device 10 not being driven. In the locking mode, the controller 910 is configured to operate the front leveling system 200a and the rear leveling system 200b to prevent oscillation of the axles 150 or to only allow a limited amount of oscillation of the axles 150. The controller 910 may be configured to switch to the free oscillation mode in response to the lift device 10 being switched to a drive mode or switch to the active mode in response to the lift apparatus 40 being repositioned (e.g., beyond the first angle threshold, the second angle threshold, etc.)

By way of yet another example, the controller 910 may be configured to operate any of the front leveling system 200a and/or the rear leveling system 200b in a fourth mode or a reset mode in response to the tilt angle of the lift base 20 exceeding a third angle threshold (e.g., five degrees, eight degree, ten degrees, twelve degrees, fifteen degrees, etc.). In the reset mode, the controller 910 may be configured to suspend or prohibit drive functionality of the lift device 10 and lock the axles 150 (while allowing a limited amount of oscillation, if any of the leveling systems 400, 500, or 600 are implemented as front leveling system 200a or rear leveling system 200b) until the lift apparatus 40 is returned to in-transport and/or centered on the central axis 26 (e.g., the lift apparatus 40 is repositioned such that the angle θ is less than the first angle threshold and the angle γ is less than the second angle threshold, the lift apparatus 40 is retracted to a rest position, etc.) to improve the stability of the lift device 10.

By way of yet another example, the controller 910 may be configured to operate the leveling system 500 to achieve the predetermined distance 560 between the ends of the rods 554 and the exterior surface of the axle 150. For example, the controller 910 may operate the first actuator 510a and the second actuator 510b to extend while monitoring sensor feedback from the distance sensors 556. Once the sensor feedback obtained from the distance sensors 556 indicates that ends of the rods 554 are the predetermined distance 560 from the exterior surface of the axle 150, the controller 910 may cease operating the first actuator 510a and the second actuator 510b to extend. Advantageously, the leveling system 400, the leveling system 500, and the leveling system 600 as described herein facilitate improved ability for oscillation control and side to side leveling ability for lift devices 10 such as booms, scissors lifts, telehandlers, etc.

Front and Rear Axle Control

Referring particularly to FIGS. 2 and 9, the controller 910 can be configured to operate both the front leveling system 200a and the rear leveling system 200b in unison to achieve desired roll stability, leveling, oscillation, etc. For example, the lift device 10 may include the front axle 150a and the rear axle 150b, each with a corresponding leveling system 200a or 200b, respectively, that includes either one or two actuators. In some embodiments, the rear leveling system 200b of the rear axle 150b is used by the controller 910 as a sensor input. For example, the controller 910 can obtain roll or tilt data from sensors of the rear leveling system 200b (e.g., the sensors 662 and 664 if the rear leveling system 200b is the leveling system 600, the sensors 412 if the rear leveling system 200b is the leveling system 400) and use the roll or tilt data to control the front leveling system 200a. The controller 910 can operate the front leveling system 200a to level the front axle 150a to compensate for any rolling or off-axis rotation of the rear axle 150b. Similarly, the front leveling system 200a can provide sensor inputs for detecting orientation or roll of the front axle 150a relative to the lift base 20 to determine control for the rear axle 150b to achieve symmetric loading of the axles 150.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A leveling system for a lift device, the leveling system comprising:

an axle configured to rotatably couple with one or more tractive elements;

a pin extending through a bore of the axle;

a chassis pivotally coupled with the axle through the pin, the chassis comprising an actuator coupled at a first end with the axle and a second end with the chassis;

a strain gauge configured to measure a load at the axle due to rotation of the chassis about the pin;

a controller configured to control the actuator to extend or retract to adjust an orientation of the chassis about the axle based on the load measured by the strain gauge; and a cradle, wherein the actuator is configured to operate to extend or retract to level the chassis relative to the cradle without adjusting a relative angular orientation between the cradle and the axle, wherein a first end of the cradle directly contacts a first corresponding surface of the axle when the cradle rocks to the first angular orientation relative to the axle, and a second end of the cradle directly contacts a second corresponding surface of the axle when the cradle rocks to a second angular orientation relative to the axle.

2. The leveling system of claim 1, wherein the actuator comprises a rod and a body, the actuator configured to extend or retract the rod relative to the body to adjust a relative angular orientation between the chassis and the axle.

3. The leveling system of claim 1, wherein the chassis is configured to rotate a limited angular amount relative to the axle.

4. The leveling system of claim 1, wherein the cradle is fixedly coupled with the pin.

5. The leveling system of claim 1, wherein the axle comprises a protrusion, wherein the protrusion includes the bore that extends through the protrusion in a longitudinal direction and the pin extends through the bore.

6. The leveling system of claim 1, wherein the strain gauge is a first strain gauge, the leveling system further comprising a second strain gauge, wherein the first strain gauge and the second strain gauge are configured to measure a strain applied as the chassis rotates relative to the axle.

7. A lift device, comprising:

an axle configured to rotatably couple with one or more tractive elements;

a pin extending through a bore of the axle;

a chassis pivotally coupled with the axle through the pin, the chassis comprising an actuator coupled at a first end with the axle and a second end with the chassis;

a strain gauge configured to measure a load at the axle due to rotation of the chassis about the pin;

a controller configured to control the actuator to extend or retract to adjust an orientation of the chassis about the axle based on the load measured by the strain gauge; and a cradle, wherein the actuator is configured to operate to extend or retract to level the chassis relative to the cradle without adjusting a relative angular orientation between the cradle and the axle;

wherein a first end of the cradle directly contacts a first corresponding surface of the axle when the cradle rocks to the first angular orientation relative to the axle, and a second end of the cradle directly contacts a second corresponding surface of the axle when the cradle rocks to a second angular orientation relative to the axle.

8. The lift device of claim 7, wherein the actuator comprises a rod and a body, the actuator configured to extend or retract the rod relative to the body to adjust a relative angular orientation between the chassis and the axle.

9. The lift device of claim 7, wherein the chassis is configured to rotate a limited angular amount relative to the axle.

10. The lift device of claim 7, wherein the cradle is fixedly coupled with the pin.

11. The lift device of claim 7, wherein the axle comprises a protrusion, wherein the protrusion includes the bore that extends through the protrusion in a longitudinal direction and the pin extends through the bore.

12. The lift device of claim 7, wherein the strain gauge is a first strain gauge, the lift device further comprising a second strain gauge, wherein the first strain gauge and the second strain gauge are configured to measure a strain applied as the chassis rotates relative to the axle.

* * * * *